United States Patent [19]
Griffing

[11] 3,899,699
[45] Aug. 12, 1975

[54] BRUSHLESS LINEAR DC MOTOR ACTUATOR

[75] Inventor: Brandt Mead Griffing, Delray Beach, Fla.

[73] Assignee: International Business Machines Corporation, Armonk, N.Y.

[22] Filed: May 28, 1974

[21] Appl. No.: 474,123

Related U.S. Application Data

[63] Continuation-in-part of Ser. No. 316,645, Dec. 19, 1972.

[52] U.S. Cl..................................... 310/13; 317/27
[51] Int. Cl.² ...................................... H02K 41/00
[58] Field of Search .............................. 310/12–15, 310/27

[56] References Cited
UNITED STATES PATENTS

| | | | |
|---|---|---|---|
| 575,699 | 1/1897 | Chaplin et al. ..................... | 310/27 |
| 3,688,035 | 8/1972 | Cless.................................. | 310/13 X |
| 3,696,204 | 10/1972 | Wallskog .......................... | 310/13 X |

*Primary Examiner*—Mark O. Budd
*Attorney, Agent, or Firm*—John C. Black; Carl W. Laumann, Jr.; J. Jancin

[57] ABSTRACT

A linear motor actuator employing an elongated magnetic field source such as a permanent magnet includes a bar of ferromagnetic material parallel to but spaced from this magnet with an electrically energizable coil slidably mounted along the bar. The coil and magnetic circuit are arranged so that energization of the coil produces current carrying conductors in the field of the magnetic circuit which imparts force to the movable coil and armature arrangement. The direction of movement of the coil is determined by the polarity of the electrical energy and the orientation of the magnetic field.

3 Claims, 8 Drawing Figures

PATENTED AUG 12 1975  3,899,699

SHEET 1

BRUSHLESS LINEAR DC MOTOR ACTUATOR

CROSS-REFERENCE TO RELATED APPLICATION

This application is a continuation-in-part of copending application Ser. No. 316,645 filed Dec. 19, 1972 entitled "Brushless Linear DC Motor Actuator" by B. M. Griffing and assigned to the same assignee as this application.

BACKGROUND OF THE INVENTION

1. Field of the Invention:

This invention relates generally to electromagnetic actuators. More particularly this invention relates to an actuator that produces linear movement. Although not limited thereto, devices in accordance with the present invention are especially useful in positioning print heads in a printer or magnetic heads relative to disks in a disk memory system or the like. The invention is useful whenever a DC voltage is to be converted to linear mechanical motion.

2. Description of the Prior Art:

Various types of mechanisms have been used to provide a linear movement for mechanisms such as print heads in printing machines, magnetic read/write heads for disks in a disk memory system, recording pen movements and the like. Print heads have been typically actuated by belt/pulley or lead screw mechanisms. Many prior art linear DC motors rely upon solenoid operation to position a bar of magnetic material. Such devices typically use travelling magnetic fields such as via sequenced coils to operate by generating magnetic flux which shifts from one end of a magnet to the other with the direction of magnetic flux being the same as the linear motion desired. Although these travelling flux field type linear actuators can convert DC to linear motion, they require relatively complex construction and control circuitry arrangements. In addition, constant velocity of movement is difficult to achieve with those devices.

Another prior art approach to linear actuators is shown in U.S. Pat. No. 2,581,133 by Niemann for a recorder stylus control device. Niemann uses two permanent magnets arranged so that they present opposing magnetic fluxes along a rod. A movable coil when actuated then effectively becomes a bar magnet with a flux field that is attracted to or repelled from the center of the rod. This design presents a number of problems. First, since the flux is strongest at its source, the strength of the flux diminishes along the length of the magnetic rod which non-uniform flux results in non-linear movement. Thus, apparatus employing this principle for linear DC motors are restricted to short stroke operation where the effects of the non-uniform flux density must be acceptable or else some form of additional compensation must be included to remove the effects of the non-linear flux along the stroke. The motor actuator of this invention overcomes these restrictions found in the prior art devices. Yet another effort to convert DC current to linear mechanical motion is shown in U.S. Pat. No. 575,699 Chaplin et al which issued on Jan. 26, 1897 on an "Electromechanical Movement". A coil is mounted around a closed loop magnetic flux return path to one side of a flat magnetic flux source which Chaplin et al shows as an electromagnet but which could as well be a permanent magnet. The magnetic flux from the source emanates from one surface through one side of the coil into the closed loop flux return path to the opposite side of the source. Introduction of DC current to the coil causes a force unbalance on the coil tending to move it in a direction determined by the current polarity. Such devices can provide a reasonable approximation of linear motion for relatively short lengths of travel of the coil. However, the magnetic reluctance R of a magnetic flux path is defined by $R = L/\mu A$ where L is the length of the flux path, A is the cross-sectional area of that flux path and $\mu$ is a permeability constant.

For a Chaplin et al flux path, A and $\mu$ stay constant but L will vary as a function of the distance from the opposite side of the source. Thus the number of magnetic flux lines which can be permitted to cross the coil of a device in accordance with Chaplin et al will vary from a maximum at either end of coil travel (minimum reluctance R) to a minimum at the center (maximum reluctance R). As a result, Chaplin et al types of actuators are incapable of true linear motion without modifications to either the flux distribution from the source or the cross-sectional area or permeability of the return path. Otherwise some means of correlating DC current to lateral coil position must be provided. However, all such modifications tend to be impractical. The lack of linearity is a technologically fatal shortcoming when relatively long lateral travel must be provided such as for serial print head movement across a platen.

Another problem which has arisen in the design of linear actuators has been the amount of space required by the motor actuator and the support needed for it. The amount of space needed in some designs has inhibited the use of various types of linear actuators.

3. Summary of the Invention:

The objects and purposes of the invention are met by providing a linear motor actuator wherein the armature is movable relative to the stator. The stator consists of an elongated magnet flux source with the magnetic flux therefrom passing through a coil on the armature, a magnetic bar of the stator located inside the coil and a magnetic core of the armature also located inside the coil. A magnetic flux return path is provided to complete the magnetic circuit so that the armature assembly and the coil moves relative to the stator by a combination of the magnetic flux and electrical energy applied to the coil. The polarity direction of electrical energy applied determines the direction of movement of the coil.

Therefore, it is an object of this invention to provide an improved linear motor actuator.

It is a further object of the present invention to provide a linear motor actuator which uses a source of a magnetic field which has a relatively constant flux density along the entire length of linear movement by the armature.

A still further object of this invention is to provide apparatus capable of converting a DC signal to a mechanical movement that can be linear or have a controlled nonlinearity.

Other objects, features and purposes of this invention will be apparent to persons acquainted with linear motors of this general type in view of the following specification and the accompanying drawings.

DETAILED DESCRIPTION

Figure 1:
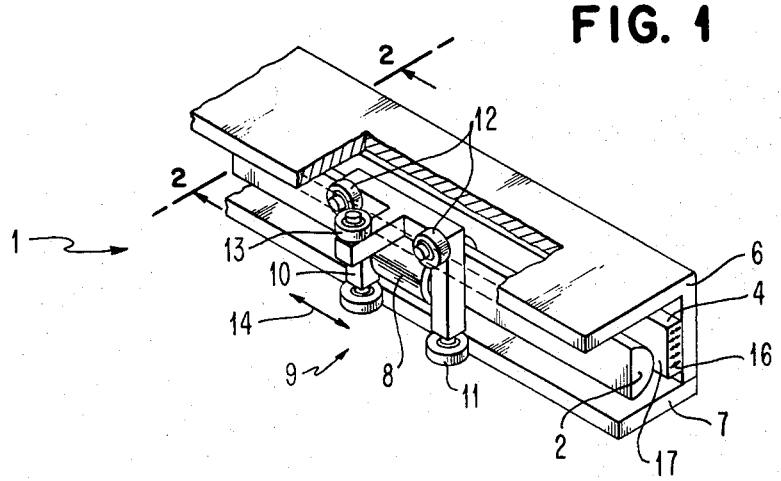
FIG. 1 is a perspective view of a linear motor construction embodying this invention.

Referring now to the drawings, the preferred embodiment of the actuator unit or linear motor construction 1 (FIG. 1) comprises two basic parts: an elongated stator assembly 5 (shown in FIG. 2), and, a movable armature assembly 9 (shown in FIG. 3) which is slidably movable along the length of and relative to the stator assembly 5. Roller bearings or slides can be used in any well-known manner to allow the relative movement of the armature with respect to the stator. Referring to the preferred embodiment shown in FIG. 1, roller bearings such as 11, 12 and 13 are attached to a ferromagnetic yoke 10 which acts as a portion of the magnetic flux return path of the armature assembly. The roller bearings are arranged so that the entire armature assembly 9 can slide over rod 2 in a path parallel to L-shaped arm 6 which acts as another portion of the magnetic flux return path means for the stator assembly. It should be understood by those skilled in the art that any other type of slide assembly which allows the relative movement between the stator and the armature could be substituted for the roller bearings of the preferred embodiment, one such alternate being the use of teflon slides rather than the roller bearings. It should also be understood the entire assembly need not be flat as shown but can be constructed in various curved configurations as long as appropriate relationships are maintained between the various parts and the flux field as desired. For instance, the assembly of FIG. 1 could be arranged as an arc instead of flat as shown.

The stator portion 5 of the actuator assembly consists of a permanent bar magnet flux source 4 magnetically coupled to the flux return path over the length of the permanent magnet. Although magnet 4 is shown as a permanent magnet, the flux field can be provided by an appropriately arranged electromagnet or by a combination of a permanent magnet and an electromagnet. The portion of the flux return path provided by arm 6 of the stator is shaped in the necessary form so that it completes the magnetic circuit from the portion of the flux return path provided by the armature to the permanent magnet 4. In the preferred embodiment shown in FIG. 1, the flux return path 6 has an L-shaped arm with the permanent magnet 4 contacting one of its sides throughout its entire length. It will be readily understood that other means of completing the magnetic circuit would be to have the magnetic flux flow through the lower bar 7 instead of or as well as through the upper part of bar 6. Also arm 6 could be fabricated by forming magnet 4 so that it receives the magnetic flux directly from flux return bar 10. Any of the preceding ways of completing the magnetic circuit is within the scope of this invention. The remainder of the stator assembly consists of a bar 2, also fabricated from ferromagnetic material, spaced from permanent magnet 4 but parallel to the permanent magnet along its entire length. As shown by arrow 16 in FIG. 1, the orientation of the magnetic field in magnet 4 is perpendicular to its length. That is, the magnetic field for magnet 4 is arranged such that the elongated flat surfaces 17 and 18 are the north/south pole faces. In addition, the direction of linear motion will be in part a function of the polarity of the magnetic field. In the preferred embodiment, bar 2 has a semi-circular cross-section to fit the inside the circular coil 8 of the armature assembly. Bar 2 could be of any cross sectional shape and such shape would depend upon the shape of the coil that is used in the armature. Bar 2 is supported at its ends by means not shown so that it remains fixed relative to the other stator elements as the armature is moved relative to the stator. The particular mounting means for the ends of bar 2 relative to the ends of stator assembly 5 is ancillary to the invention.

Figure 3:
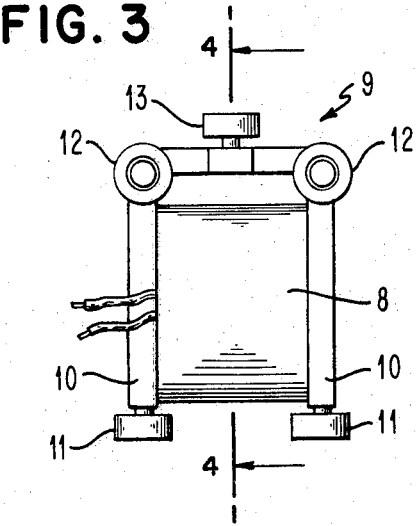
FIG. 3 is a view of the linear motor actuator of FIG. 1 showing the armature or moving portion of the motor.
Figure 4:
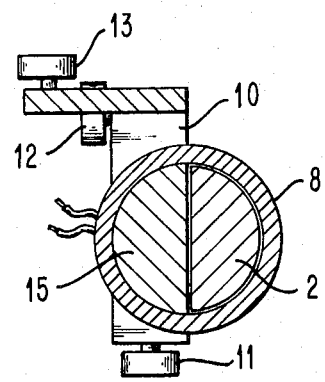
FIG. 4 is a cross sectional view of the armature portion taken along line 4—4 of FIG. 3 showing the core of the armature inside the coil.

The armature assembly 9 shown in FIGS. 3 and 4 consists of a coil 8, a ferromagnetic core 15 and a flux return path or yoke 10 all mounted to move together relative to the stator 5. The coil 8 is cylindrical in the preferred embodiment with half of the inner portion of the cylinder having a core of ferromagnetic material 15 of partially circular cross section permanently attached to it. Core 15 occupies approximately one-half of the inside of the cylindrical coil 8 with bar 2 of the stator being slightly spaced from core 15 and occupying approximately the other half of the side of the cylindrical coil. The spacing between the core and the bar allows the armature assembly 9 to be moved relative to the stator assembly 5. To complete the magnetic circuit generated from permanent magnet 4, a flux return path 10 in the armature is fixed to the ends of the cylindrical coil 8 and core section 15 and extends to but is spaced slightly away from one side of the flux return path 6 of the stator. This slight spacing is again needed to allow relative movement between the armature and the stator. There has now been described a complete magnetic circuit originating from permanent magnet 4, passing through the coil 8 on the side between bar 2 and magnet 4, through the ferromagnetic bar 2, through core 15, and out the ends of coil 8 into yoke 10 and arm 6 thus completing the magnetic circuit. Note that roller mounts such as 11, 12 and 13 are primarily provided in such a manner as to maintain relatively constant spacing of the magnetic flux path elements between movable armature assembly 9 and the elements of stator assembly 5. As a result, the reluctance R of these magnetic flux path will be substantially constant regardless of the position of armature assembly 9 along bar 2 thereby providing linear motion for a constant DC current in coil 8. The only significant potential non-linearity could be from flux leakage around the extreme ends of bar 2 but this can be easily accommodated by simply making bar 2 slightly longer than flux source 4 and/or flux return arm 6.

If desired, grooves or retaining means can be formed on or attached to the interior portion of the flux return path bar 6 to allow easy assembly, movement and support of the armature assembly relative to the stator assembly. It will be found for some applications that this support may not be necessary in the preferred embodiment, however, if the armature and the stator are attracted and held sufficiently together by the magnetic force. The operation of the device embodying the invention will be described in detail hereinbelow for a better understanding of the invention.

When a device in accordance with the preferred embodiment of this invention is completely assembled, the permanent magnet 4 radiates magnetic flux which crosses the gap between bar 2 and the permanent magnet, through coil 8 and then into core 15. Thereupon the magnetic flux exits the ends of the coil into the low reluctance return paths 10 and 6 back to the permanent magnet 4. The direction of motion 14 is normal to the plane defined by vectors of coil current and the flux field 16 from that stator source. The direction of the force on the armature is a function of the particular north/south orientation of the stator flux field at pole faces 17 and 18 of magnet 4 and the polarity of the current through coil 8. Application of a DC current to coil 8 effects a force upon armature 9 from the aforementioned interaction and therefore imparts a constant velocity of motion to armature 9 if the flux distribution along the length of magnet 4 is relatively uniform. However, variable speed of movement of armature 9 can be achieved by controlling the magnitude of current applied to coil 8 and/or controlling the magnetic flux density along the length of magnet 4.

Figure 5:
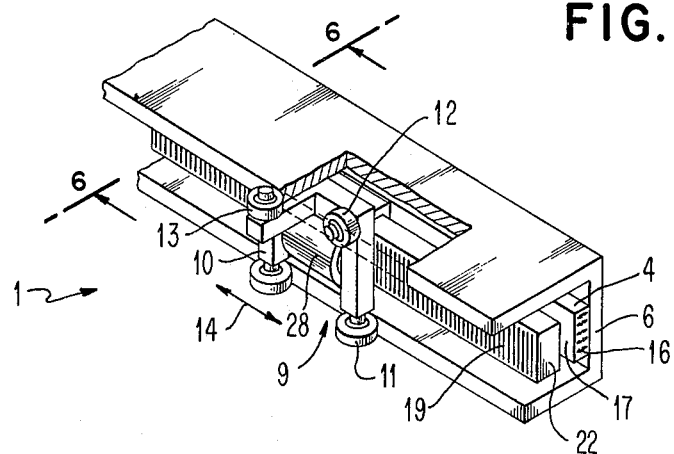
FIG. 5 is a perspective view of another embodiment of this invention including some potential improvements relative to FIG. 1.
Figure 6:
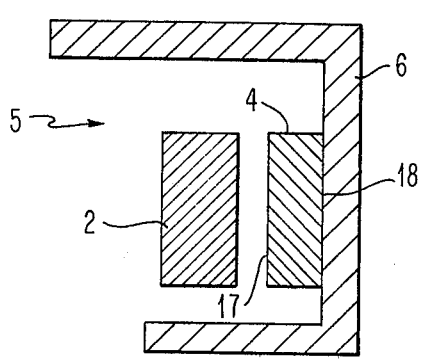
FIG. 6 is a partial section view of the FIG. 5 linear actuator taken along line 6—6 of FIG. 5 to show the stator elements.
Figure 7:
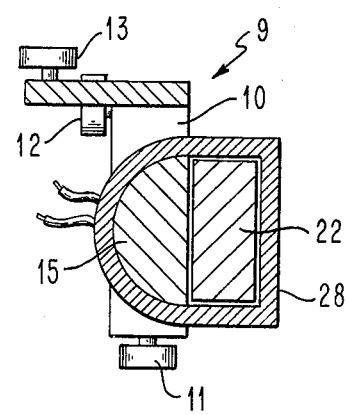
FIG. 7 is a cross-section of the armature elements associated with section line 6—6 of FIG. 5.

FIG. 5 shows an embodiment of the present invention which is similar in many respects to FIG. 1 but with some potential improvements. The operation of the FIG. 5 device is substantially the same as FIGS. 1–4 and similar reference numerals are used for similar elements. Although interfacing of the circular surfaces of bar 2 and coil 8 with the flat surface of source 4 as shown in FIG. 1 has been successfully reduced to practice and is relatively easy to fabricate, the reluctance of the gap can be further reduced by making bar 22 of rectangular cross-section as shown in FIGS. 5 and 6 and spacing it from the surface of source 4 so as to accommodate a partially rectangular coil 28 as shown in FIG. 7. An additional improvement can be made by laminating bar 22 such as is shown at 19 so as to increase the reluctance of bar 22 in the direction of its length. This will reduce the tendency of flux that does not cut coil 28 to be drawn into the return path comprised of core 15 and yoke arms 10 from the extremities of bar 22. By laminations 19 for assembly of bar 22, the total flux that crosses coil 28 to act on the current in that coil to produce lateral moving forces is increased. Note further that lamination of flux return path arm 6 somewhat along the lines of laminations 19 for bar 22 may further enhance the flux coupling efficiency of the apparatus.

Figure 2:
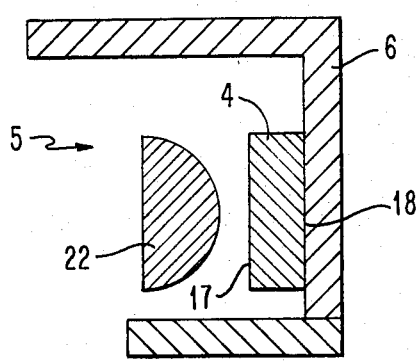
FIG. 2 is a partial section view of the linear motor actuator taken on line 2—2 of FIG. 1 showing the stationary stator portion of the motor.
Figure 8:
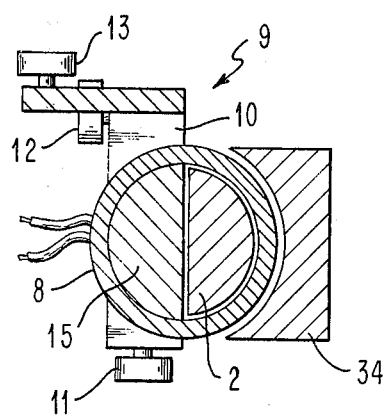
FIG. 8 is a partial section view showing a potential improvement for the FIG. 1 embodiment.

Yet another improvement is shown in FIG. 8 which is a cross-section somewhat along the lines of FIGS. 2 and 6 wherein the reference numerals correspond to similar elements in the other figures. In FIG. 8, flux source 34 is constructed and arranged so as to conform to the outer surface of coil 8 with a minimal spacing therebetween. The coil contour matching portion of source 34 in FIG. 8 could be fabricated separately of ferromagnetic material and bonded to a flat surfaced bar magnet if desired.

While the invention has been particularly shown and described with reference to the preferred embodiments thereof, it will be understood by those skilled in the art that various changes in form and detail in addition to variations specifically mentioned herein may be made without departing from the spirit and scope of the invention.

What is claimed is:

1. A linear actuator comprising
    a magnetic flux field source having two elongated surfaces with the magnetic flux field being produced perpendicular to said two surfaces,
    a first bar of ferromagnetic material parallel to but spaced from said magnetic source surfaces for providing a low magnetic reluctance path therebetween,
    a coil mounted around said first bar for permitting relative motion between said coil and said bar,
    means movable with said coil and at least partially mounted within said coil for providing a low magnetic reluctance path between said first bar and one of said magnetic flux sources surfaces,
    said means for providing a low reluctance path from within said coil being attached to said coil and being comprised of a center portion and two arms in a generally U-shaped configuration with said center portion passing through said coil and with the outer ends of said arms terminating in proximity to said one of said magnetic flux source surfaces, and
    means for applying electrical energy to said coil,
    whereby a moving force is applied to said coil in a direction determined by the polarity of the said electrical energy and the orientation of the magnetic field polarity from said source.

2. The linear actuator as defined in claim 1 wherein said magnetic flux source includes
    a permanent magnet for producing a magnetic flux field perpendicular to two elongated surfaces thereof, and
    an arcuate magnetic circuit completing means for transferring the magnetic flux from one of said permanent magnet elongated surfaces to said first bar so as to provide one of said magnetic flux field source elongated surfaces.

3. A linear actuator comprising
    a magnetic flux field source having two elongated surfaces with the magnetic flux field being produced perpendicular to said two surfaces,
    a first bar of ferromagnetic material parallel to but spaced from said magnetic source surfaces for providing a low magnetic reluctance path therebetween,
    said first bar of ferromagnetic material being comprised of a plurality of elements arranged in a laminated configuration with said elements being oriented substantially perpendicular to said two surfaces, whereby the longitudinal reluctance of said first bar is increased,
    a coil mounted around said first bar for permitting relative motion between said coil and said bar,
    means movable with said coil and at least partially mounted within said coil for providing a low magnetic reluctance path between said first bar and one of said magnetic flux source surfaces, and
    means for applying electrical energy to said coil,
    whereby a moving force is applied to said coil in a direction determined by the polarity of the said electrical energy and the orientation of the magnetic field polarity from said source.

* * * * *